US010911652B2

(12) United States Patent
Kang et al.

(10) Patent No.: US 10,911,652 B2
(45) Date of Patent: Feb. 2, 2021

(54) IMAGE ACQUIRING DEVICE

(71) Applicant: LG ELECTRONICS INC., Seoul (KR)

(72) Inventors: Hyungjoo Kang, Seoul (KR); Dongryeol Lee, Seoul (KR); Salkmann Ji, Seoul (KR); Samnyol Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 247 days.

(21) Appl. No.: 16/059,845

(22) Filed: Aug. 9, 2018

(65) Prior Publication Data

US 2019/0320098 A1  Oct. 17, 2019

(30) Foreign Application Priority Data

Apr. 16, 2018 (KR) .................. 10-2018-0044038

(51) Int. Cl.
*H04N 5/225* (2006.01)
*G02B 3/12* (2006.01)

(52) U.S. Cl.
CPC ............. *H04N 5/2254* (2013.01); *G02B 3/12* (2013.01); *H04N 5/2253* (2013.01)

(58) Field of Classification Search
CPC ...... G02B 3/14; G02B 26/004; G02B 26/005; G02B 3/12; G02B 1/043; G02B 1/041; G02B 13/0075; G02B 7/028; G02B 1/04; G02B 27/646; G02B 30/27; G02B 3/0056; G02B 3/02; G02B 7/08; G02B 13/0085; G02B 1/06; G02B 26/0825; G02B 27/0068; G02B 3/0012; G02B 3/0062; G02B 3/0075; G02B 7/36; G02B 13/001; G02B 13/003; G02B 13/0045; G02B 13/009; G02B 13/18; G02B 15/177; G02B 1/005; G02B 1/007; G02B 1/045; G02B 1/046;

(Continued)

(56) References Cited

U.S. PATENT DOCUMENTS

| 4,783,155 A | * | 11/1988 | Imataki | ................ | G02B 3/14 |
| | | | | | 359/666 |
| 2009/0295986 A1 | | 12/2009 | Topliss et al. | | |
| 2011/0032624 A1 | * | 2/2011 | Bolis | ................ | G02B 26/0825 |
| | | | | | 359/666 |

FOREIGN PATENT DOCUMENTS

JP        61-38902 A     2/1986
JP     2014-235317 A    12/2014
(Continued)

*Primary Examiner* — Collin X Beatty
*Assistant Examiner* — Grant A Gagnon
(74) *Attorney, Agent, or Firm* — Birch, Stewart, Kolasch & Birch, LLP

(57) ABSTRACT

Disclosed is an image acquiring device, including a liquid lens having a shape changed by pressurization, a membrane provided to one surface of the liquid lens, the membrane forming a pressurization surface, a pressurizing member provided to an outside of the membrane, and a support wire provided across a prescribed region of an outer surface of the pressurizing member, the support wire moving the pressurizing member toward the membrane by contracting by conduction, the support wire moving the pressurizing member toward an opposite side of the membrane by expanding. Accordingly, the present invention solves a problem of a mismatched focus in a close-up photo and minimizes an increasing volume of the image acquiring device.

11 Claims, 11 Drawing Sheets

(58) Field of Classification Search
CPC ........... G02B 2006/12102; G02B 2006/12104;
G02B 2006/12107; G02B 2006/1213;
G02B 2006/12171; G02B 21/02; G02B
21/24; G02B 23/12; G02B 26/02; G02B
26/06; G02B 26/0833; G02B 26/0866;
G02B 27/0025; G02B 27/0093; G02B
27/022; G02B 3/0006; G02B 3/04; G02B
5/18; G02B 6/138; G02B 7/04; G02B
7/10; G02B 7/102; G02B 7/182; G02B
7/28; G02B 7/30; G02B 7/365; G02B
7/38; H04N 5/2254; H04N 13/322; H04N
13/305; H04N 13/356; H04N 5/2257;
H04N 5/23212; H04N 5/2328
USPC ......................................................... 359/665
See application file for complete search history.

(56) References Cited

FOREIGN PATENT DOCUMENTS

| KR | 10-2012-0065208 A | 6/2012 |
|----|-------------------|--------|
| KR | 10-2013-0020263 A | 2/2013 |
| KR | 10-2013-0036626 A | 4/2013 |
| KR | 10-2016-0074202 A | 6/2019 |

* cited by examiner (a)

(b)

IMAGE ACQUIRING DEVICE

This application claims priority to Korean Patent Application No. 10-2018-0044038 filed on Apr. 16, 2018, in Korea, the entire contents of which is hereby incorporated by reference in its entirety.

BACKGROUND OF THE INVENTION

Field of the Invention

The present invention relates to an image acquiring device, suitable for performing autofocusing by having a liquid lens.

Discussion of the Related Art

In an image acquiring device, the demand for improving autofocusing performance is rising. Regarding autofocusing, a focusing speed is important. And, whether focusing is available for a subject in a short distance becomes an important performance measure.

In order to perform focusing on a subject in a short distance, it is necessary to change a focal distance of a lens. Generally, a focal distance change of a lens is performed in a manner that a whole lens group of an image acquiring device makes a translational motion in an optical axis direction.

Yet, since a scheme of performing autofocusing by translational motion of a lens is physically limited, it is difficult to use the scheme for a close shot within 10 cm and the like.

As one of schemes for enabling such a close distance focusing, a liquid lens can be used. As a shape of a liquid lens is changed, a focal distance is changed. So, the liquid lens is distinguished from a glass or plastic lens of which shape is not changed.

In order to change a shape of a liquid lens, a related art method uses a magnet and coil device system (voice coil motor, hereinafter named VCM). In case of a liquid lens having a VCM drive system, a space for accommodating the corresponding drive system is large and its manufacturing costs are high, disadvantageously.

Therefore, provided is an image acquiring device having an improved liquid lens drive system to solve such disadvantages.

SUMMARY OF THE INVENTION

Accordingly, embodiments of the present invention are directed to an image acquiring device that substantially obviates one or more problems due to limitations and disadvantages of the related art.

One object of the present invention is to solve the above problem, i.e., a problem of a focus mismatch in a close-up photo. Another object of the present invention is to minimize an increasing volume of an image acquiring device.

Technical tasks obtainable from the present invention are non-limited by the above-mentioned technical tasks. And, other unmentioned technical tasks can be clearly understood from the following description by those having ordinary skill in the technical field to which the present invention pertains.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

In one technical aspect of the present invention, provided herein is an image acquiring device, including a liquid lens having a shape varied by pressurization, a membrane provided to one surface of the liquid lens so as to form a pressurization surface, a pressurizing member provided to an outside of the membrane, and a support wire provided across a prescribed region of an outer surface of the pressurizing member, the support wire moving the pressurizing member toward the membrane by contracting by conduction, the support wire moving the pressurizing member toward an opposite side of the membrane by expanding.

According to another aspect of the present invention, the support wire includes shape-memory-alloy having a length contracting in response to application of current.

According to another aspect of the present invention, the pressurizing member is provided onto the one surface of the liquid lens so as to form a ring shape, a pair of insertion recesses parallel to each other are formed on both sides of the one surface of the ring shape, and the support wire is fitted into a pair of the insertion recesses so as to pressurize the both sides of the pressurizing member.

According to another aspect of the present invention, a pair of the insertion recesses are provided in form of parallel straight lines.

According to another aspect of the present invention, the support wire is fixed in a polygonal shape including at least 6 line segments.

According to another aspect of the present invention, the support wire is provided as a single body so as to pass through a pair of the insertion recesses.

According to another aspect of the present invention, an anode having one end of the support wire connected thereto and a cathode having the other end of the support wire connected thereto are provided to one side of a pair of the insertion recesses.

According to another aspect of the present invention, the image acquiring device further includes a case having the liquid lens installed therein and a fixing portion provided to the case, the fixing portion provided to each of both sides of a pair of the insertion recesses, wherein the fixing portion includes a first fixing member fixing one end and the other end of the support wire and a second fixing member fixing a prescribed region of a center of the support wire.

According to another aspect of the present invention, the image acquiring device further includes an elastic member provided to the case so as to form a restoration force for spacing the pressurizing member apart from the liquid lens.

According to another aspect of the present invention, the pressurizing member is formed of metal material.

According to another aspect of the present invention, the image acquiring device further includes at least one lens located in rear of an optical path of the liquid lens and a lens body tube fixing the at least one lens.

In another technical aspect of the present invention, provided herein is an image acquiring device, including a liquid lens having a refractive index varied by pressurization, a membrane provided to one surface of the liquid lens so as to form a pressurization surface, a pressurizing member provided to an outside of the membrane, a support wire provided across a prescribed region of an outer surface of the pressurizing member, the support wire moving the pressurizing member toward the membrane by contracting by conduction, the support wire moving the pressurizing member toward an opposite side of the membrane by expanding, and a lens controller controlling the support wire to contract or expand in a manner of applying a current to the support wire or interrupting the current, and the lens controller applies the current to the support wire in response to a first external signal for decreasing a focal distance.

According to another aspect of the present invention, the image acquiring device further includes at least one lens located in rear of an optical path of the liquid lens and an image sensor located in rear of the optical path of the at least one lens, and the lens controller applies a current strength to the support wire step by step in response to a second external signal for a 3D image and controls the image sensor to acquire a plurality of images in response to a state that the current strength is changed step by step.

It is to be understood that both the foregoing general description and the following detailed description are exemplary and explanatory and are intended to provide further explanation of the invention as claimed.

Accordingly, the present invention provides the following effects and/or features.

First of all, according to at least one of embodiments of the present invention, a VCM drive system can be advantageously omitted in driving a liquid lens.

According to at least one of embodiments of the present invention, manufacturing costs are lowered by omitting a VCM drive system and an occupied space can be reduced, advantageously.

According to at least one of embodiments of the present invention, power consumption can be reduced advantageously.

According to at least one of embodiments of the present invention, a liquid lens can be driven stably and advantageously.

According to at least one of embodiments of the present invention, error can be corrected easily and advantageously.

According to at least one of embodiments of the present invention, an unintentionally generated error can be minimized advantageously.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Image acquiring devices described in the present specification may include cellular phones, smart phones, laptop computers, digital broadcast terminals, personal digital assistants (PDAs), portable multimedia players (PMPs), navigators, slate PCs, tablet PCs, ultra books, wearable devices (e.g., smart watches, smart glasses, head mounted displays (HMDs)), and the like.

By way of non-limiting example only, further description will be made with reference to particular types of image acquiring devices. However, such teachings apply equally to other types of terminals, such as those types noted above. In addition, these teachings may also be applied to stationary terminals such as digital TV, desktop computers, signage and the like.

Figure 1A:
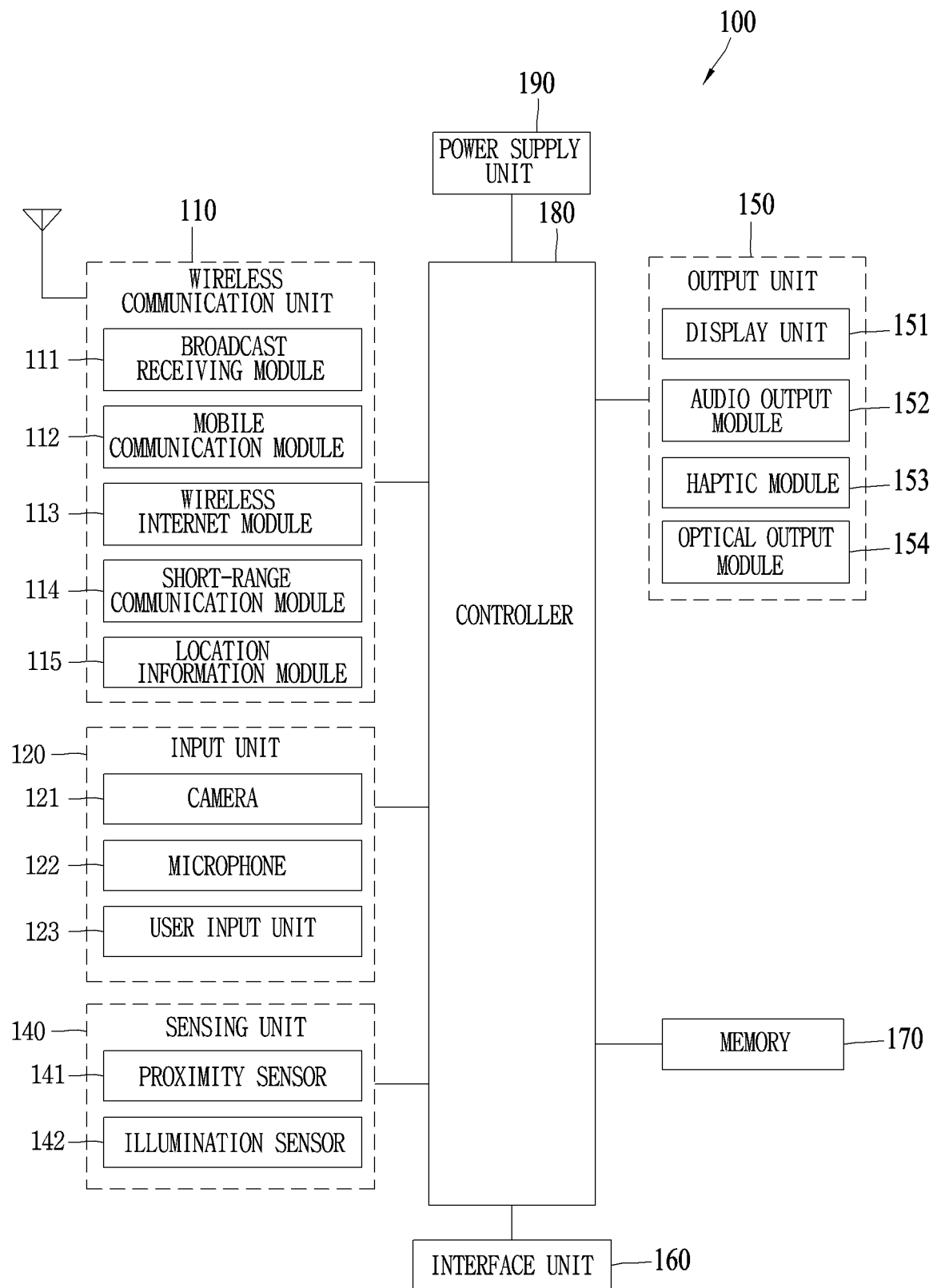
FIG. 1A is a block diagram to describe an image acquiring device according to the present invention.
Figure 1B:
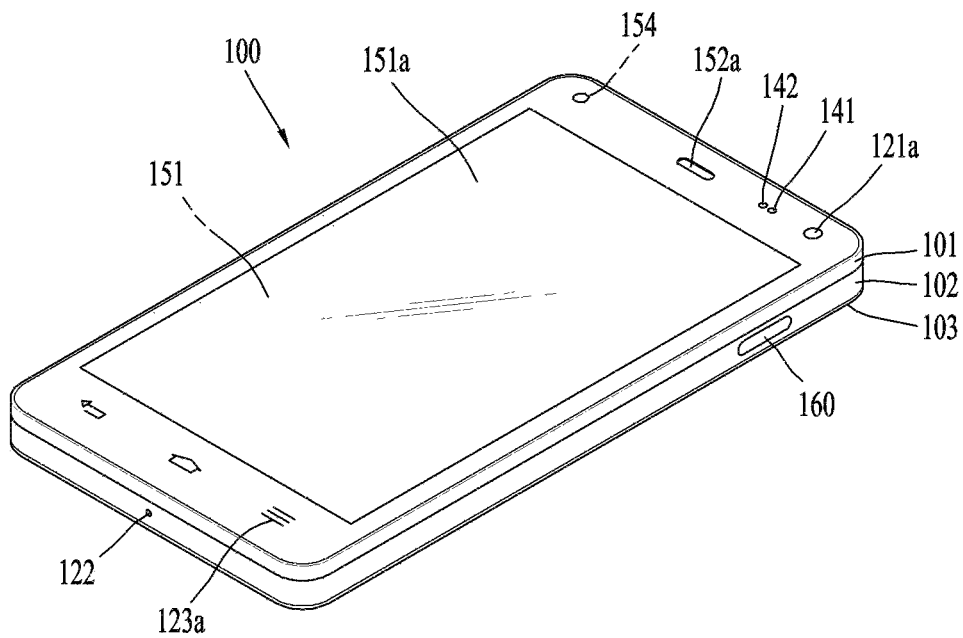
FIG. 1B and FIG. 1C are conceptual diagrams for one example of an image acquiring device according to the present invention, viewed from different directions.
Figure 1C:
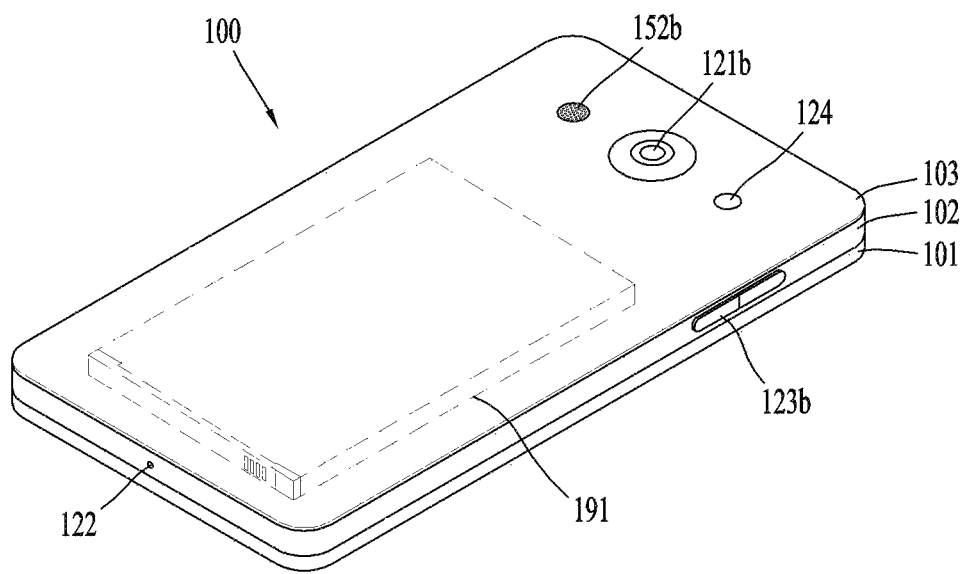

Referring to FIGS. 1A to 1C, FIG. 1A is a block diagram to describe an image acquiring device according to the present invention, and FIG. 1B and FIG. 1C are conceptual diagrams for one example of an image acquiring device according to the present invention, viewed from different directions.

The image acquiring device 100 may include a wireless communication unit 110, an input unit 120, a sensing unit 140, an output unit 150, an interface unit 160, a memory 170, a controller 180, a power supply unit 190, etc. It is understood that implementing all of the illustrated components shown in FIG. 1A is not a requirement in implementing the image acquiring device 100, and that greater or fewer components may alternatively be implemented.

In particular, the wireless communication unit 110 among the components may typically include one or more modules which permit communications such as wireless communications between the image acquiring device 100 and a wireless communication system, communications between the image acquiring device 100 and another image acquiring device, communications between the image acquiring device 100 and an external server. Further, the wireless communication unit 110 typically includes one or more modules which connect the image acquiring device 100 to one or more networks.

The wireless communication unit 110 may include one or more of a broadcast receiving module 111, a mobile communication module 112, a wireless Internet module 113, a short-range communication module 114, and a location information module 115.

The input unit 120 includes a camera 121 or video input unit for a video signal input, a microphone 122 or audio input unit for an audio signal input, and a user input unit 123 (e.g., a touch key, a push key, etc.) for receiving an input of information from a user. Voice or image data collected by the input unit 120 may be analyzed and processed as a user's control command.

The camera 121, which is described as a component of the input unit 120, includes at least one of a camera sensor (e.g., CCD, CMOS, etc.), a photo sensor (or an image sensor), and a laser sensor.

The camera 121 and the laser sensor are mutually combined so as to sense a sensing target's touch to a 3D stereoscopic image. The photo sensor can be stacked on a display device. Such a photo sensor is configured to scan a motion of a sensing target. In particular, the photo sensor has a photo diode and transistor (TR) installed in a row/column, thereby scanning a content put on the photosensor using an electrical signal changed according to an amount of light applied to the photo diode. Namely, the photo sensor performs coordinate calculation of a sensing target according to a change amount of light, whereby location information of a sensing target can be obtained.

The camera 121 may conceptually include the configuration such as a liquid lens and the like. The sensing unit 140 is typically implemented using one or more sensors configured to sense internal information of the image acquiring device 100, surrounding environment information of the image acquiring device 100, and user information. For example, the sensing unit 140 may alternatively or additionally include other types of sensors or devices, such as a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (e.g., the camera 121), a microphone 122, a battery gauge, an environment sensor (e.g., a barometer, a hygrometer, a thermometer, a radiation detection sensor, a thermal sensor, and a gas sensor, among others), and a chemical sensor (e.g., an electronic nose, a health care sensor, a biometric sensor, and the like), to name a few. The image acquiring device 100 disclosed in the present specification may be configured to utilize information obtained from the sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output unit 152, a haptic module 153, and an optical output unit 154. The display unit 151 may have an inter-layered structure or an integrated structure with a touch sensor in order to implement a touchscreen. The touchscreen may provide an output interface between the image acquiring device 100 and a user, as well as function as the user input unit 123 that provides an input interface between the image acquiring device 100 and the user.

The interface unit 160 serves as an interface with various types of external devices that can be coupled to the image acquiring device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the image acquiring device 100 may perform assorted control functions associated with a connected external device, in response to the external device connected to the interface unit 160.

The memory 170 is typically implemented to store data to support various functions or features of the image acquiring device 100. For instance, the memory 170 may be configured to store application programs executed in the image acquiring device 100, data or instructions for operations of the image acquiring device 100, and the like. Some of these application programs may be downloaded from an external server via wireless communication. Other application programs may be installed on the image acquiring device 100 at time of manufacturing or shipping, which is typically the case for basic functions of the image acquiring device 100 (e.g., a phone call receiving/sending function, a message receiving/sending function, etc.). It is common for application programs to be stored in the memory 170, installed on the image acquiring device 100, and executed by the controller 180 to perform an operation (or function) for the image acquiring device 100.

The controller 180 typically functions to control overall operations of the image acquiring device 100, in addition to the operations associated with the application programs. The controller 180 may provide or process information or functions appropriate for a user by processing signals, data, information and the like, which are input or output by the various components depicted in the above, or launching application programs stored in the memory 170.

Moreover, in order to launch the application program stored in the memory 170, the controller 180 can control some or all of the components illustrated in FIG. 1A at least. Furthermore, in order to launch the application program, the controller 180 can combine and activate at least two of the components included in the image acquiring device 100.

The controller 180 can conceptually include a lens controller described later. Physically, the controller 180 may be provided independently or in form of an integrated chip. For example, the controller 180 may include a processor and be provided in form of System-On-Chip (SOC).

The power supply unit 190 can be configured to receive external power or provide internal power in order to supply appropriate power required for operating elements and components included in the image acquiring device 100 under the control of the controller 180. The power supply unit 190 may include a battery, and the battery may include an embedded battery or a replaceable battery.

At least some of the components can cooperatively operate to implement an operation, a control or a controlling method of the image acquiring device 100 according to various embodiments described in the following. The operation, control or controlling method of the image acquiring device 100 may be implemented on the image acquiring device 100 by launching at least one application program stored in the memory 170.

Referring to FIG. 1B and FIG. 1C, the disclosed image acquiring device 100 includes a bar-type terminal body, by which the present invention is non-limited. The present invention is applicable to various configurations such as a watch type, a clip type, a glasses type and the like. And, the present invention is also applicable to such configurations, in which at least two bodies are combined together in a manner of being relatively movable, as a folder type, a flip type, a slide type, a swing type, a swivel type and the like. Discussion herein will often relate to a particular type of an image acquiring device. Yet, such teachings with regard to a particular type of an image acquiring device will generally apply to other types of image acquiring devices as well.

Here, the terminal body may be appreciated as a concept of regarding the image acquiring device 100 as at least one assembly.

The image acquiring device 100 may generally include a case (e.g., frame, housing, cover, etc.) forming the appearance of the image acquiring device. According to this embodiment, as shown in the drawing, the image acquiring device 100 may include a front case 101 and a rear case 102. Various electronic components are disposed in a space provided by coupling the front case 101 and the rear case 102 together. At least one middle case may be additionally disposed between the front case 101 and the rear case 102.

The display unit 151 is disposed on the front side of the terminal body to output information. As illustrated, a window 151a of the display unit 151 may be mounted on the front case 101 to form the front surface of the terminal body together with the front case 101.

In some cases, electronic components may also be mounted on the rear case 102. Examples of such electronic components mountable on the rear case 102 may include a detachable battery, an identification module, a memory card, and the like. A rear cover 103 is configured to cover the electronic components, and this cover may be detachably coupled to the rear case 102. Therefore, if the rear cover 103 is detached from the rear case 102, the electronic components mounted on the rear case 102 are externally exposed.

As illustrated, if the rear cover 103 is coupled to the rear case 102, a lateral surface of the rear case 102 may be partially exposed. In some cases, upon the coupling, the rear case 102 may also be completely shielded by the rear cover 103. In some embodiments, the rear cover 103 may include an opening for externally exposing a camera 121b or an audio output unit 152b.

The cases 101, 102 and 103 may be formed by injection-molding synthetic resin or may be formed of a metal, for example, stainless steel (STS), aluminum (Al), titanium (Ti), or the like.

As an alternative to the example in which a plurality of the cases form an inner space for accommodating various electronic components, the image acquiring device 100 may be configured such that a single case forms the inner space. In this example, an image acquiring device 100 having a uni-body is formed in such a manner that synthetic resin or metal extends from a side surface to a rear surface.

If desired, the image acquiring device 100 may include a waterproofing unit (not shown) for preventing introduction of water into the terminal body. For example, the waterproofing unit may include a waterproofing member which is disposed between the window 151a and the front case 101, between the front case 101 and the rear case 102, or between the rear case 102 and the rear cover 103, to hermetically seal an inner space when those cases are coupled.

The image acquiring device 100 may include a first audio output unit 152a, a second audio output unit 152b, a proximity sensor 141, an illumination sensor 142, an optical output unit 154, a first camera 121a, a second camera 121b, a first manipulation unit 123a, a second manipulation unit 123b, a microphone 122, an interface unit 160 and the like.

At least one of the first and second cameras 121a and 121b may include elements necessary for an image acquiring configuration including a liquid lens that will be described later.

For the following description, as shown in FIG. 1B and FIG. 1C, the image acquiring device 100 having the following dispositions is taken as one example. First of all, the display unit 151, the first audio output unit 152a, the proximity sensor 141, the illumination sensor 142, the optical output unit 154, the first camera 121a and the first manipulation unit 123a are disposed on a front side of the terminal body. Secondly, the second manipulation unit 123b, the microphone 122 and the interface unit 160 are disposed on a lateral side of the terminal body. Thirdly, the second audio output unit 152b and the second camera 121b are disposed on a rear side of the terminal body.

Yet, it is to be understood that alternative dispositions are possible within the teachings of the instant disclosure. Some components may be omitted, replaced, or disposed on another side. For example, the first manipulation unit 123a may not be provided to the front side of the terminal body, and the second audio output unit 152b may be provided not to the rear side of the terminal body but to the lateral side of the terminal body.

The display unit 151 displays (or outputs) information processed in the image acquiring device 100. For example, the display unit 151 may display a running screen information of an application program run on the image acquiring device 100, a user interface (UI) information in response to the running screen information, and/or a graphic user interface (GUI) information in response to the running screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented using at least two display devices, which can implement the same or different display technology. For instance, a plurality of the display devices may be disposed on one side in a manner of being spaced apart from each other or being integrated, or these devices may be disposed on different sides, respectively.

The display unit 151 may also include a touch sensor which senses a touch input to the display unit 151 in order to receive an input of a control command by a touch mechanism. If a touch is applied to the display unit 151, the touch sensor senses the touch and the controller 180 may generate a control command or other signals corresponding to the touch. The content inputted by the touch mechanism may include a text, a numeral, or a menu item which can be indicated or designated in various modes.

The touch sensor may be configured in a form of a film having a touch pattern, disposed between the window 151a and a display (not shown in the drawing) on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

Thus, the display unit 151 may also form a touchscreen together with the touch sensor. Here, the touchscreen may serve as the user input unit 123 (see FIG. 1A). In some cases, therefore, the touchscreen may replace at least some of the functions of the first manipulation unit 123a.

The first audio output unit 152a may be implemented in the form of a receiver configured to deliver a call sound to a user's ear, while the second audio output unit 152 may be implemented in the form of a loud speaker configured to output various alarm sounds, a multimedia play sound, and the like.

The window 151a of the display unit 151 will typically include a sound hole to discharge the sound generated from the first audio output unit 152a, by which the present invention is non-limited. Alternatively, the sound can be discharged through an assembly gap between the structural bodies (e.g., a gap between the window 151a and the front case 101, etc.). In this case, a hole independently formed to output audio sounds may not be seen externally or is otherwise hidden in terms of appearance, thereby further simplifying the appearance of the image acquiring device 100.

The optical output unit 154 can be configured to output light for indicating an occurrence of an event. Examples of such an event include a message reception, a call signal reception, a missed call, an alarm, a schedule notification, an email reception, an information reception through an application, and the like. If it is detected that a user has confirmed the event, the controller 180 can control the optical output unit 154 to stop outputting the light.

The first camera 121a can process image frames of still images or video obtained by the image sensor in shot mode or video call mode. The processed image frames can be displayed on the display unit 151 or saved to the memory 170.

The first and second manipulation units 123a and 123b are examples of the user input unit 123 manipulated by a user to receive an input of a command for controlling an operation of the image acquiring device 100, may be commonly referred to as a manipulating portion as well, and may employ any tactile methods that allow the user to perform manipulation such as a touch, a push, a scroll, or the like by experiencing a tactile sense. The first and second manipulation units 123a and 123b may also employ any non-tactile methods that allow the user to perform manipulation such as a proximity touch, a hovering touch, or the like by experiencing no tactile sense.

In the present drawing, the first manipulation unit 123a is depicted as a touch key, by which the present invention is non-limited. For example, the first manipulation unit 123a may include a push key or a combination of a touch key and a push key.

A variety of contents inputted through the first and second manipulation units 123a and 123b can be set. For example, the first manipulation unit 123a may receive an input of a command such as menu, home key, cancel, search, or the like, and the second manipulation unit 123b may receive an input of a command such as a volume level control of a sound outputted from the first/second audio output unit 152a/152b, a switch to a touch recognition mode of the display unit 151, or the like.

As another example of the user input unit 123, a rear input unit (not shown in the drawing) may be provided to the rear surface of the terminal body. The rear input unit can be manipulated to receive an input of a command for controlling an operation of the image acquiring device 100. And, contents of the input can be set variously. For example, the rear input unit can receive an input of a command such as power on/off, start, end, scroll, a volume level adjustment of sound outputted from the first/second audio output unit 152a/or 152b, a switch to a touch recognition mode of the display unit 151, or the like. The rear input unit may be configured to enable a touch input, a push input, or a combination thereof.

The rear input unit may be disposed to overlap the display unit 151 of the front side in a thickness direction of the terminal body. As one example, the rear input unit may be disposed on an upper end portion of the rear side of the terminal body such that a user can easily manipulate it using a forefinger on grabbing the terminal body with one hand, by which the present invention is non-limited. Alternatively, a location of the rear input unit can be changed.

Thus, in case that the rear input unit is provided to the rear side of the terminal body, it is able to embody a user interface of a new type using the rear input unit. Moreover, as the touchscreen or the rear input unit mentioned in the foregoing description replaces at least one function of the first manipulation unit 123a provided to the front side of the terminal body, if the first manipulation unit 123a is not disposed on the front side of the terminal body, the display unit 151 can configure a wider screen.

Meanwhile, the image acquiring device 100 may include a fingerprint recognition sensor configured to scan a user's fingerprint. The controller 180 can use a fingerprint information sensed through the fingerprint recognition sensor as an authentication means. The fingerprint recognition sensor may be installed in the display unit 151 or the user input unit 123.

The microphone 122 is configured to receive inputs of a user's voice and other sounds. The microphone 122 is provided to a plurality of spots and configured to receive an input of stereo sound.

The interface unit 160 may serve as a passage for connecting the image acquiring device 100 to an external device. For example, the interface unit 160 may include at least one of a connection terminal for connecting to another device (for example, an earphone, an external speaker, etc.), a port for near field communication (for example, an Infrared Data Association (IrDA) port, a Bluetooth port, a wireless LAN port, etc.), and a power supply terminal for supplying power to the image acquiring device 100. The interface unit 160 may be implemented in the form of a socket for accommodating an external card, such as Subscriber Identification Module (SIM), User Identity Module (UIM), or a memory card for information storage.

The second camera 121b may be disposed at the rear side of the terminal body and have an image capturing direction substantially opposite to that of the first camera unit 121a.

The second camera 121b may include a plurality of lenses arranged along at least one line. A plurality of the lenses may be arranged in a matrix form. The cameras may be named "array camera." In case that the second camera 121b is configured with an array camera, images can be taken in various manners using a plurality of the lenses and images of better quality can be obtained.

A flash 124 may be disposed adjacent to the second camera 121b. When an image of a subject is taken using the second camera 121b, the flash 124 may apply light toward the subject.

The second audio output unit 152b may be additionally disposed on the terminal body. The second audio output unit 152b may implement stereophonic sound functions in conjunction with the first audio output unit 152a, and may be also used in implementing a speaker phone mode for call communication.

At least one antenna for wireless communication may be provided to the terminal body. The antenna may be installed in the terminal body or formed at the case. For example, an antenna configuring a part of the broadcast receiving module 111 (cf. FIG. 1A) may be configured retractable into the terminal body. Alternatively, an antenna of a film type is formed and attached to an inner surface of the rear cover 103. Alternatively, a case containing a conductive material may be configured to function as an antenna.

The power supply unit 190 (cf. FIG. 1A) configured to supply power to the image acquiring device 100 can be provided to the terminal body. The power supply unit 190 may include a battery 191, and the battery may include an embedded battery or a replaceable battery.

The battery 191 may be configured to receive power via a power source cable connected to the interface unit 160. Also, the battery 191 may be configured to be recharged by wireless through a wireless charger. Wireless charging may be implemented by magnetic induction or resonance (e.g., electromagnetic resonance).

According to the example shown in the present drawing, the rear cover 103 is coupled to the rear case 102 to cover the battery 191. Hence, it is able to restrict separation of the battery 191 and to protect the battery 191 from an external impact or particles. In case that the battery 191 is configured detachable from the terminal body, the rear case 103 may be detachably coupled to the rear case 102.

Figure 2:
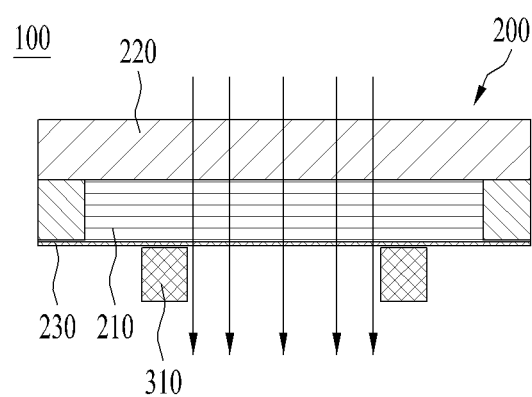
FIG. 2 is a conceptual cross-sectional diagram of a liquid lens of an image acquiring device according to the present invention.
Figure 2:
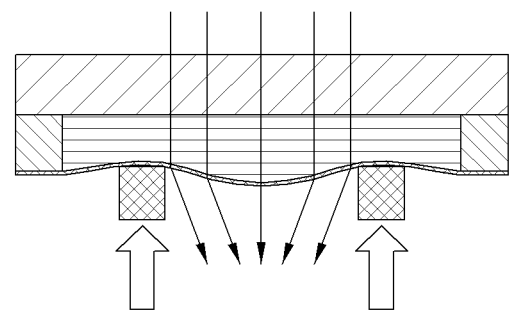

FIG. 2 is a conceptual cross-sectional diagram of a liquid lens 200 of an image acquiring device 100 according to the present invention.

The liquid lens 200 may be characterized in that refraction is changed because arrangement of a liquid 210 inside is changed depending on physical pressurization.

Referring to FIG. 2(a), if physical pressurization is not applied to the liquid lens 200, the liquid lens 200 has an infinite focal distance theoretically.

Referring to FIG. 2(b), as physical pressurization is applied to the liquid lens 200, a shape of the liquid 210 is changed and a refractive index is changed, whereby a focal distance becomes finite.

Here, a deforming subject can be defined as the liquid lens 200 and a configuration for applying physical deformation to the liquid lens 200 is defined as a pressurizing member 310.

A membrane 230 is provided to one side of the liquid lens 200 so as to form a pressurization surface, and the pressurizing member 310 deforms a shape of the liquid lens 200 by pressurizing the membrane 230.

The liquid lens 200 is enclosed with the membrane 230, a glass substrate 220 or the like so as to be deformed into a specific shape or maintain a specific shape.

Figure 3:
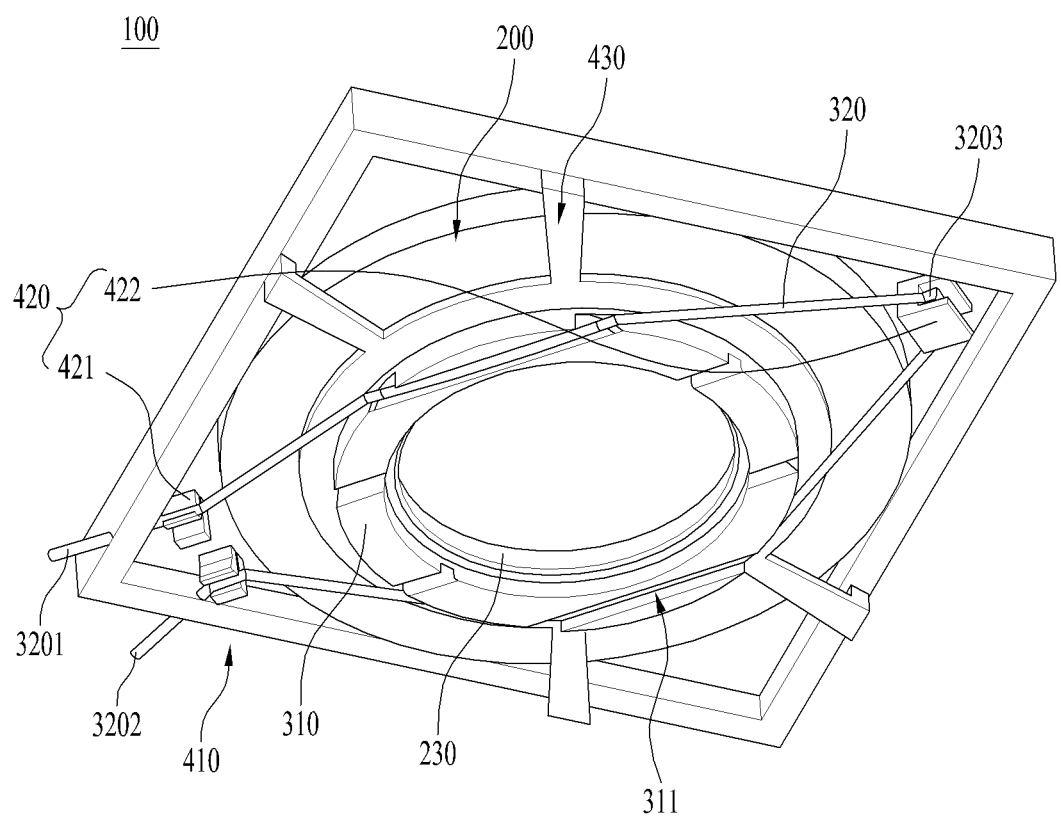
FIG. 3 is a perspective diagram of a partial backside of an image acquiring device according to the present invention.

FIG. 3 is a perspective diagram of a partial backside of an image acquiring device according to the present invention.

Referring to FIG. 3, a liquid lens 200 may form a circular pressurization surface, and a pressurizing member 310 may have a ring shape as well. Yet, the shape of each of the liquid lens 200 and the pressurizing member 310 is non-limited by the circular shape but may have a different shape if necessary.

The pressurizing member 310, which is provided to an outside of the membrane 230, gets closer in a direction toward the liquid lens 200 or moves far in an opposite direction. Hence, the pressurizing member 310 may be selectively pressurized or a pressurization extent may be differentiated on pressurizing the pressurizing member 310.

The pressurizing member 310 is formed of metal material, whereby shape deformation possibility can be minimized.

Instead of the aforementioned related art VCM drive system, according to the present invention, a support wire 320 provides a moving force to the pressurizing member 310.

The support wire 320 is provided across a prescribed region of an outer surface of the pressurizing member 310. As a length of the support wire 320 is changed, a pressurization extent for the pressurizing member 310 can be differentiated.

The length of the support wire 320 itself may expand or contract according to physical property. Or, the support wire 320 expands or contracts according to a winding or unwinding extent of one or both ends of the support wire 320, whereby the pressurizing member 310 is pressurized so as to differentiate a pressurization extent of the liquid lens 200.

According to the present embodiment, the support wire 320 may include a shape-memory-alloy. A length of the support wire 320 including the shape-memory-alloy can change due to a temperature change depending on a presence or non-presence of an applied current. For example, if a current is applied, a temperature rises so that the length contracts. If a current does not flow, the length can expand due to a temperature drop.

The expansion or contraction of the support wire 320 moves the pressurizing member 310. In case that the support wire 320 contracts, the pressurizing member 310 is moved toward the membrane 230. In case that the support wire 320 expands, the pressurizing member 310 is moved toward an opposite side.

In order to enable the pressurizing member 310 stably by maintaining the coupling with the pressurizing member 310 on expansion or contraction of the support wire 320, the pressurizing member 310 may have an insertion recess 311. The insertion recess 311 prevents separation of the support wire 320.

If the pressurizing member 310 is provided in a ring shape, the insertion recess 311 can be provided to both sides of the pressurizing member 310 symmetrically. As the insertion recess 311 is symmetrically provided to both sides, when the support wire 320 presses the pressurizing member 310, it is able to prevent the pressurizing member 310 from being distorted unintentionally.

The insertion recess 311 may be provided to an outer surface of the pressurizing member 310. A pair of the insertion recesses 311 may include a pair of straight lines parallel to each other or have other shapes for efficient force action.

Figure 4:
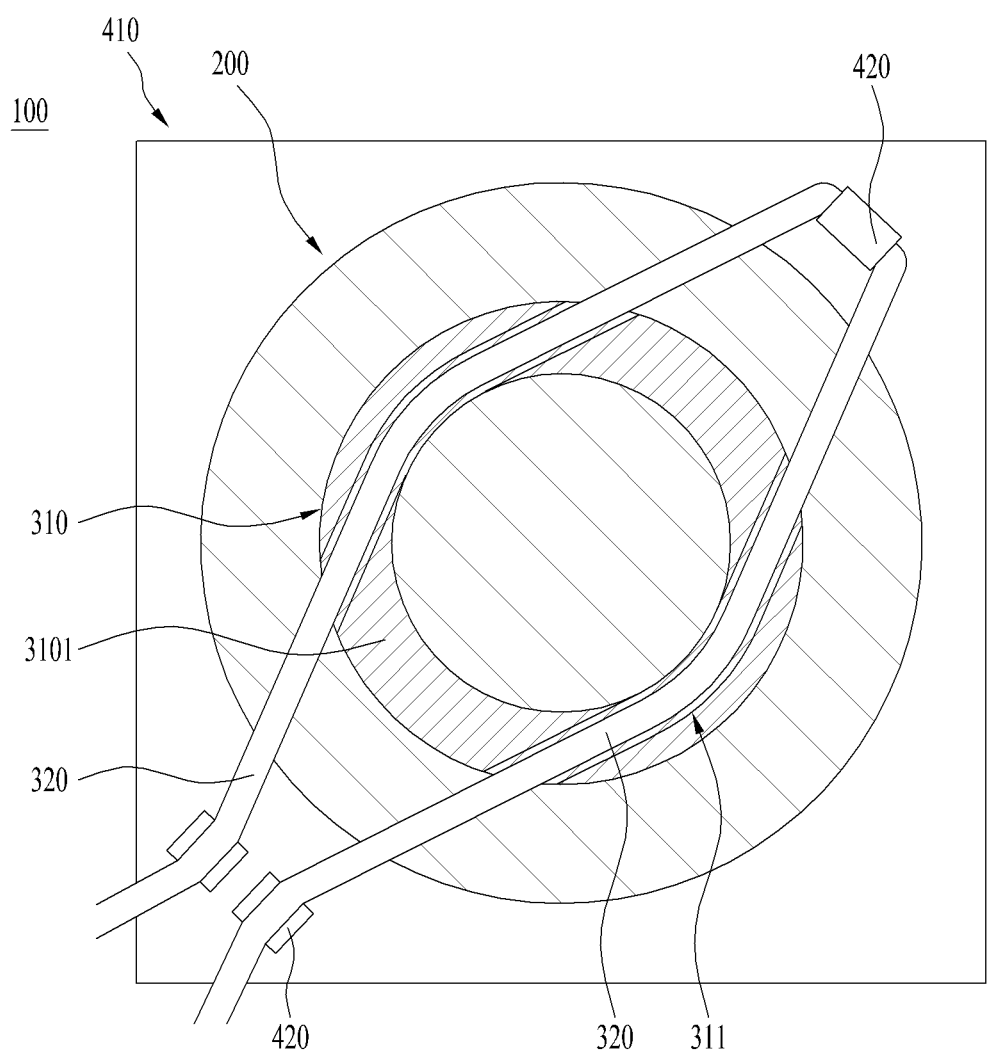
FIG. 4 is a diagram of an image acquiring device according to another embodiment of the present invention.

FIG. 4 is a diagram of an image acquiring device 100 according to another embodiment of the present invention.

Referring to FIG. 4, unlike the former embodiment of FIG. 3, an insertion recess 311 may have a curved shape to minimize a bent region of a support wire 320.

A pair of the insertion recesses 311 may be provided in a manner of maximally inclining to an outside of an outer surface of the pressurizing member 310. The reason for this is to minimize the unintended generation of rotational torque in a manner that the support wire 320 supports the pressurizing member 310 externally.

Figure 5:
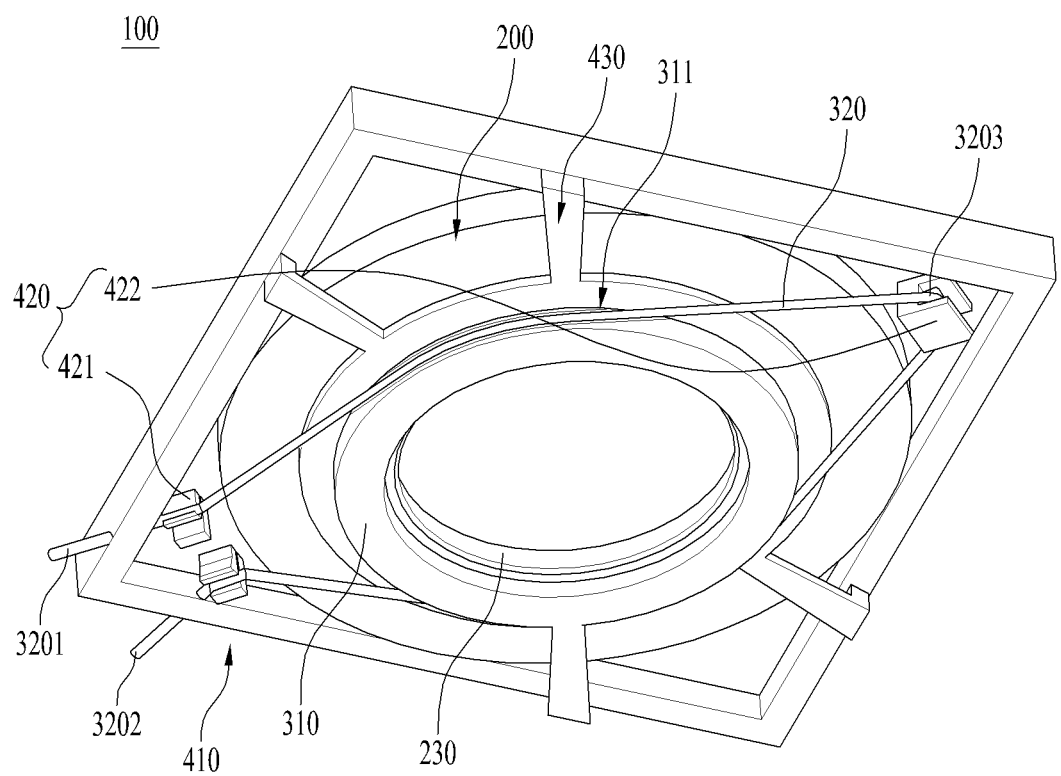
FIG. 5 is a diagram of an image acquiring device according to another embodiment of the present invention.

FIG. 5 is a diagram of an image acquiring device 100 according to another embodiment of the present invention.

Alternatively, a pair of insertion recesses 311 may be provided to a lateral side of a pressurizing member 310 in a ring shape. If the insertion recesses 311 are provided to the lateral side of the pressurizing member 310, a support wire 320 can naturally adhere to the pressurizing member 310 without a bent portion of the support wire 320. If the bent portion of the support wire 320 is minimized, when the support wire 320 expands or contracts, it is able to minimize the lack of proper transfer of force due to the support wire 320 caught on the pressurizing member 310.

Figure 6:
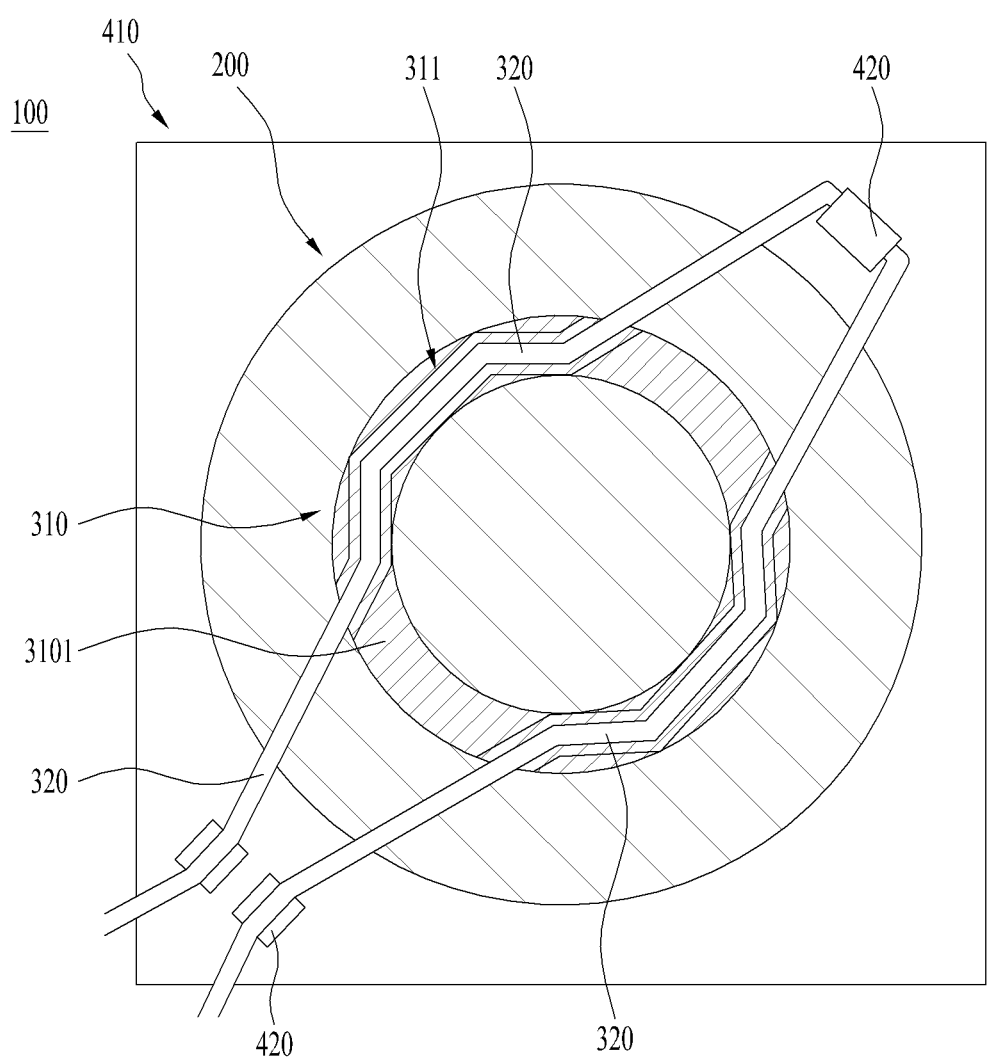
FIG. 6 is a diagram of an image acquiring device according to another embodiment of the present invention.

FIG. 6 is a diagram of an image acquiring device according to another embodiment of the present invention.

Alternatively, if a pressurizing member 310 has a ring shape and an insertion recess 311 is formed on an outer surface 3101 of the pressurizing member 310, the insertion recess 311 may have a polygonal shape so as to have a shape maximally similar to that of the pressurizing member 310. For example, the insertion recess 311 is configured with 6 line segments on the outer surface 3101 of the insertion recess 311, thereby configuring a partial shape of a hexagon.

Referring to FIGS. 3 to 6, a single support wire is configured. One end of the support wire can be connected to the anode, while the other can be connected to the cathode.

Figure 7:
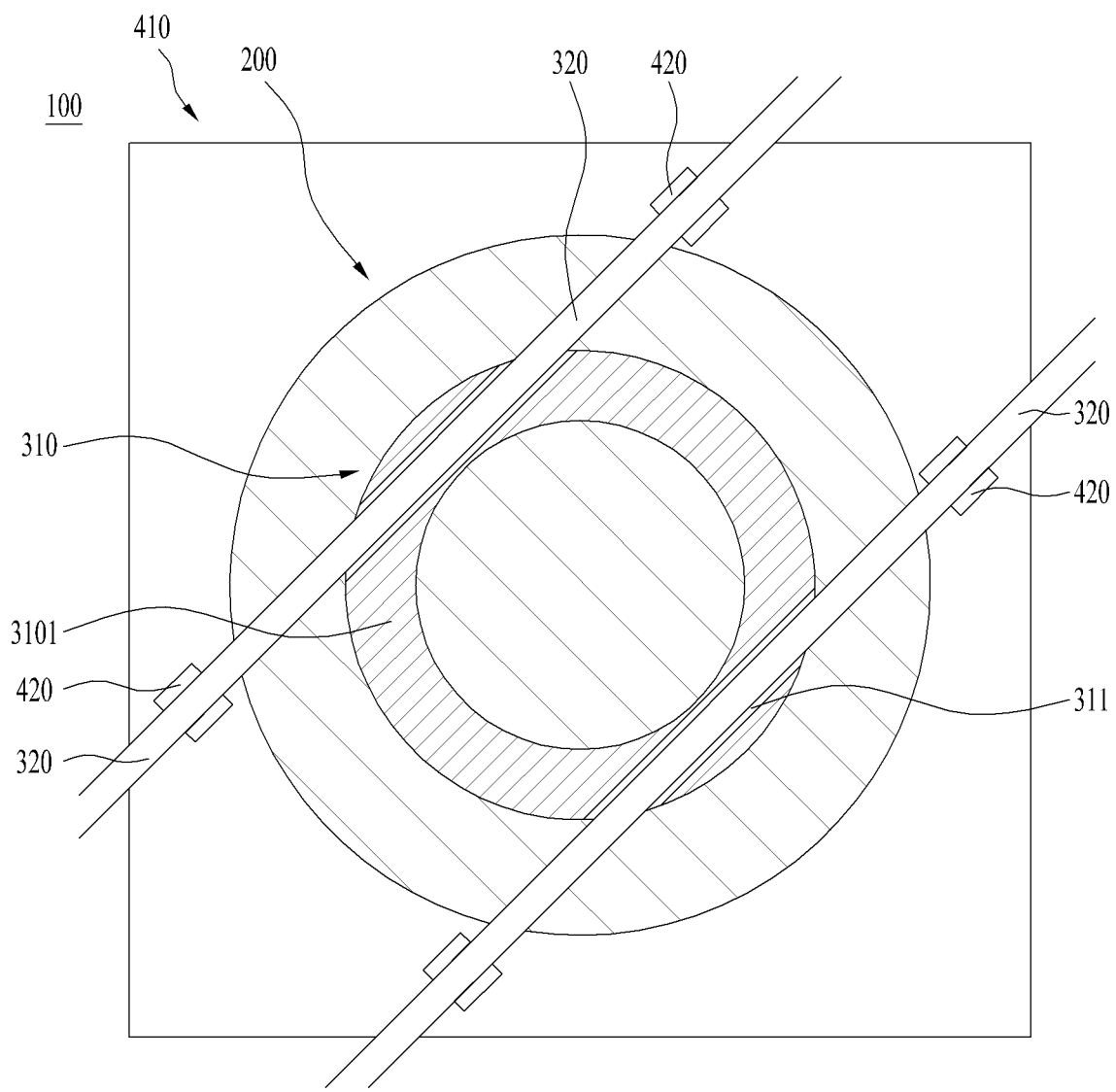
FIG. 7 is a diagram of an image acquiring device according to further embodiment of the present invention.

FIG. 7 is a diagram of an image acquiring device 100 according to further embodiment of the present invention.

Referring to FIG. 7, unlike the former embodiments of FIGS. 3 to 6, 2 wires 320a and 320b can be provided to a pair of insertion recesses 311a and 311b, respectively.

As the 2 wires are provided, if a pressurizing member 310 is driven, since it is able to independently control an extent of contraction or expansion of each of the wires 320a and 320b, it is able to adjust a fine movement of the pressurizing member 310. If error is generated from the movement of the pressurizing member 310, the error correction is facilitated. Moreover, it is advantageous in that the degree of freedom for the shape or disposition of the insertion recess 311 increases relatively.

On the contrary, if the pressurizing member 310 is driven by the single support wire 320 like FIG. 3 to FIG. 6, as one end 3201 and the other end 3202 of the support wire 320 are provided to enclose the pressurizing member 320, it is able to minimize the space occupation for circuit configuration. In case that the single support wire 320 is provided in a manner of enclosing the pressurizing member 310, one end 3201 and the other end 3202 of the support wire 320 may be provided to one side 3111 of a pair of the insertion recesses 311.

As a center 3203 of the support wire 320 is provided to the other side 3112 of a pair of the insertion recesses 311, the support wire 320 is fixed to both sides of the pressurizing member 310, whereby a force can be applied to the pressurizing member 310 stably.

A liquid lens 200 is installed in a case 410. And, the case 410 can provide relative matters to which configurations related to the liquid lens 200 are fixed.

Referring to FIG. 3 again, a fixing portion 420 provided to the case 410 fixes the support wire 320 to both sides of the pressurizing member 310. The fixing portion 420 can fix the support wire 320 by a hook mechanism.

The fixing portion 420 can include a first fixing member 421 and a second fixing member 422. The first fixing member 421 fixes one end 3201 and the other end 3202 of the support wire 320, and the second fixing member 422 fixes a prescribed region of the center 3203 of the support wire 320.

An elastic member 430 forms a force of restoration in a direction of spacing the pressurizing member 310 apart from the liquid lens 200. Namely, despite that the support wire 320 is relaxed, it is able to prevent the support wire 320 from pressurizing the liquid lens 200 unintentionally due to an effect of its own weight and the like.

Figure 8:
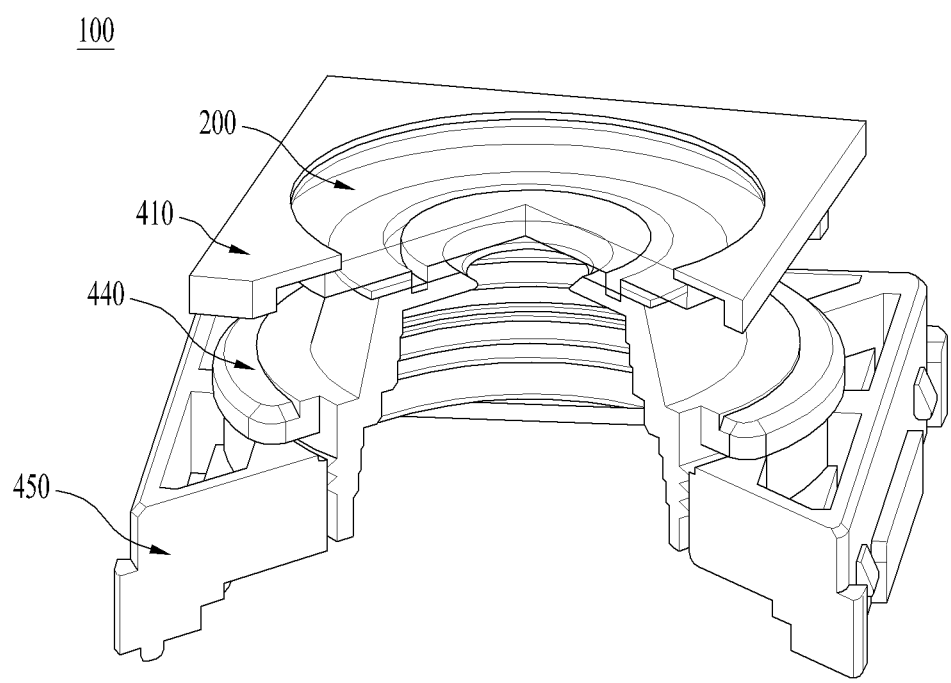
FIG. 8 is a diagram showing a stereoscopic image acquiring process of an image acquiring device according to the present invention.

FIG. 8 is a diagram showing one cross-section of an image acquiring device 100 according to the present invention.

An image acquiring device 100 can include additional components for an optical system configuration as well as the components shown in FIG. 3.

At least one lens can be provided to a lens body tube 440. At least one lens may be located in rear of an optical path of a liquid lens 200.

A lens holder 450 can play a role in fixing the lens body tube 440 thereto.

The aforementioned case 410 can fix the lens body tube 440 or the lens holder 450 thereto.

In a related art image acquiring device, many configurations should be added to an outside of the lens body tube or the lens holder in order to drive VCM for autofocusing. Yet, the present invention just needs a circuit unit configuration connected to a support wire 320, whereby the device can be downsized.

Figure 9:
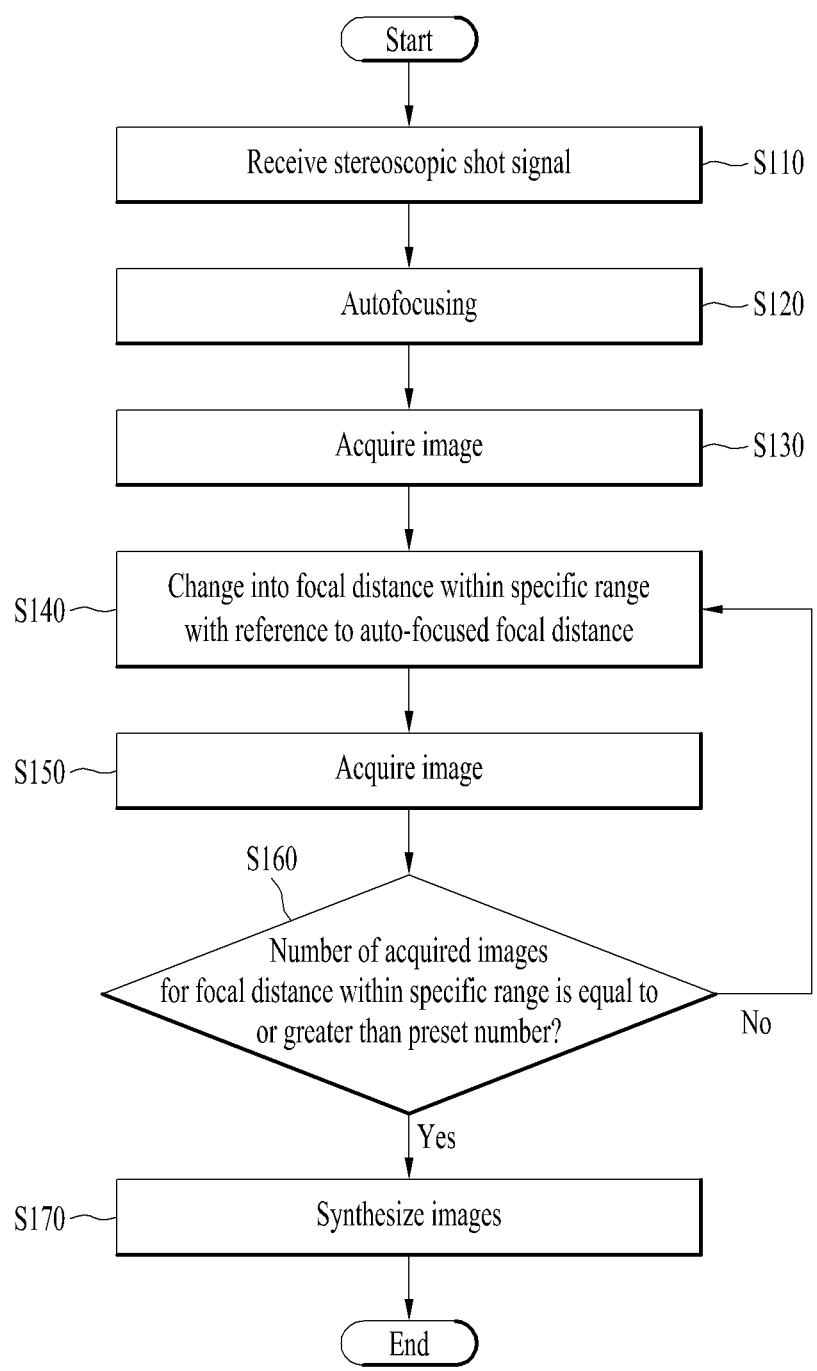
FIG. 9 is a conceptual diagram of an image acquiring device according to the present invention.
Figure 10:
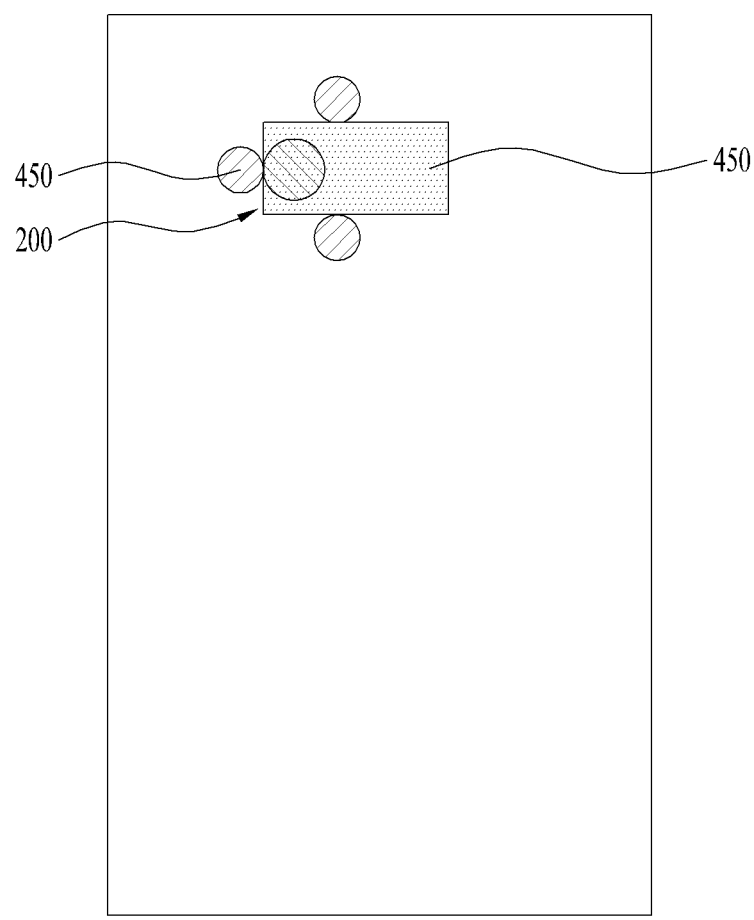
FIG. 10 is a conceptual diagram of an image acquiring device according to the present invention.

FIG. 9 shows a stereoscopic image acquiring process of an image acquiring device according to the present invention, and FIG. 10 is a conceptual diagram of an image acquiring device related to the present embodiment.

An image acquiring device according to the present invention can acquire a stereoscopic image of a subject as a selection width of a focal distance is widened. This can be acquired in a manner of performing a close-up shot of a subject, acquiring a plurality of images through multi-layer shots, and synthesizing and rendering the images.

Namely, a lens controller acquires a plurality of images by consecutively differentiating a focal distance of a liquid lens in a short time and then extracts a 3D image or a depth image of a subject by operating the acquired images.

If receiving a stereoscopic shot signal for a subject, the lens controller acquires an image by performing autofocusing on the subject. The stereoscopic shot signal may include a signal according to a user's command. Or, the stereoscopic shot signal may be generated if a preset condition is met. For example, as a result of autofocusing, if a distance from a lens of the image acquiring device to the subject is equal to or smaller than a specific distance, a stereoscopic shot signal can be automatically generated.

Once a focal distance is determined by the autofocusing on the subject, the lens controller can acquire a plurality of images for a focal distance within a specific range. The image acquisition can be configured in various ways. For example, image can be acquired for the preset number of different focal distances for a focal distance within a specific range, or images may be acquired plural times in a specific interval with reference to an auto-focused focal distance.

In this case, an image acquiring device 100 may further include an astral lamp LED 450 for providing light to a subject effectively for a close-up shot. The astral lamp LED 450 has high illumination intensity and high color rendering and performs a function specialized for the prevention of radiation heat, hand shadow and the like.

The astral lamp LED 450 may be provided to an ambient part of an opening 460 of the image acquiring device 100.

It will be appreciated by those skilled in the art that various modifications and variations can be made in the present invention without departing from the spirit or scope of the inventions.

This description is intended to be illustrative, and not to limit the scope of the claims. Thus, it is intended that the present invention covers the modifications and variations of this invention provided they come within the scope of the appended claims and their equivalents.

What is claimed is:

1. An image acquiring device comprising:
a liquid lens having a shape varied by pressurization;

a case enclosing the liquid lens to accommodate the liquid lens therein;

a membrane provided to one surface of the liquid lens;

a pressurizing member contacting the membrane, the pressurizing member being entirely disposed within an outer circumference of the membrane; and a support wire installed on the pressurizing member and configured to move the pressurizing member by a change of a length in a longitudinal direction of the support wire to selectively press the membrane, the support wire traversing the pressurizing member and extending beyond the membrane to connect opposite positions on the case, wherein the support wire is configured to:
   push the pressurizing member toward the membrane by contracting in the longitudinal direction in response to application of current; and
   pull the pressurizing member away from the membrane by expanding in the longitudinal direction in response to non-application of the current.

2. The image acquiring device of claim 1, wherein the pressurizing member is formed of metal material.

3. The image acquiring device of claim 1, further comprising:
   at least one lens located in rear of an optical path of the liquid lens; and
   a lens body tube fixing the at least one lens.

4. The image acquiring device of claim 1, wherein the support wire comprises shape-memory-alloy contracting in response to the application of the current.

5. The image acquiring device of claim 4, wherein the pressurizing member comprises a ring member, wherein a pair of insertion recesses parallel to each other are formed on both at both sides of an outer surface of the pressurizing member, and wherein the support wire is fitted into the pair of insertion recesses so as to pressurize the both sides of the pressurizing member.

6. The image acquiring device of claim 5, wherein the pair of insertion recesses are provided as parallel straight lines.

7. The image acquiring device of claim 5, wherein the support wire is fixed in a polygonal shape including at least 6 line segments.

8. The image acquiring device of claim 5, wherein the support wire is provided as a single body so as to pass through the pair of insertion recesses.

9. The image acquiring device of claim 8, wherein an anode having a first end of the support wire connected thereto and a cathode having a second end of the support wire connected thereto are provided adjacent to the pair of insertion recesses.

10. The image acquiring device of claim 9, further comprising:
   a fixing portion provided to the case, the fixing portion provided to each of both sides of the pair of insertion recesses,
   wherein the fixing portion comprises a first fixing member fixing the first end and the second end of the support wire and a second fixing member fixing a prescribed region of a center of the support wire.

11. The image acquiring device of claim 10, further comprising an elastic member provided to the case so as to form a restoration force for spacing the pressurizing member apart from the liquid lens.

* * * * *